US006280869B1

(12) United States Patent
Chen

(10) Patent No.: US 6,280,869 B1
(45) Date of Patent: Aug. 28, 2001

(54) FUEL CELL STACK SYSTEM AND OPERATING METHOD

(75) Inventor: Tan-Ping Chen, Walnut Creek, CA (US)

(73) Assignee: Nexant, Inc., San Francisco, CA (US)

(*) Notice: Subject to any disclaimer, the term of this patent is extended or adjusted under 35 U.S.C. 154(b) by 0 days.

(21) Appl. No.: 09/364,019

(22) Filed: Jul. 29, 1999

(51) Int. Cl.$^7$ .................................................. H01M 2/02
(52) U.S. Cl. ............................... 429/34; 429/13; 429/17; 429/34; 429/38; 429/57
(58) Field of Search .................................. 429/13, 17, 34, 429/38, 57

(56) References Cited

U.S. PATENT DOCUMENTS

| | | | |
|---|---|---|---|
| 4,510,212 | * 4/1985 | Fraioli | 429/30 |
| 4,753,857 | * 6/1988 | Hosaka | 429/38 |
| 4,910,100 | * 3/1990 | Nakanishi et al. | 429/32 |
| 5,034,288 | * 7/1991 | Bossel | 429/32 |
| 5,045,413 | * 9/1991 | MArianowski et al. | 429/13 |
| 5,082,751 | * 1/1992 | Reichner | 429/19 |
| 5,227,256 | * 7/1993 | Marianowski et al. | 429/16 |
| 5,827,620 | * 10/1998 | Kendall | 429/31 |
| 5,851,689 | 12/1998 | Chen . | |
| 5,938,800 | * 8/1999 | Verrill et al. | 48/127.9 |

* cited by examiner

Primary Examiner—Gabrielle Brouillette
Assistant Examiner—Dah-Wei D. Yuang
(74) Attorney, Agent, or Firm—Townsend and Townsend and Crew LLP

(57) ABSTRACT

A fuel cell stack (6) includes at least first and second cells (40) and a separator assembly (42). Each cell includes an anode (44), a cathode (46) and electrolyte (48) between them. The separator assembly includes a fluid separator (58) having a fuel side, an oxidant side, an anode spacer element (68) between the fuel side and the anode of the first cell and a cathode spacer element (80) between the oxidant side and the cathode of the second cell. The separator assembly further includes a cathode exhaust passageway (86), having an exhaust inlet (84) at the central region (82) of the cathode spacer element, and an anode feed passageway (64), including a continuous loop anode feed tube, located spaced apart from the cell peripheral edge, with radially inwardly and outwardly directed fuel outlets (76, 78). An air deflector (62) helps prevent radially inwardly moving air from contacting the anode while permitting the air access to the peripheral edge (102) of the cathode spacer element. An anode recycle passageway (106) has a recycle inlet (108) fluidly coupled to spent fuel, including residual fuel and cell reaction product water, at the center of the anode, and a recycle outlet (110), within the anode feed passageway, so that the cell reaction product water can be used as a steam source for internal reforming.

42 Claims, 9 Drawing Sheets

FUEL CELL STACK SYSTEM AND OPERATING METHOD

CROSS-REFERENCE TO RELATED APPLICATIONS

This is related to U.S. Pat. No. 5,851,689, entitled Method for Operating A Fuel Cell Assembly, and U.S. patent application Ser. No. 09/131,483, entitled Fuel Cell Assembly, invented by the same inventor and assigned to the same assignee of the present application.

BACKGROUND OF THE INVENTION

A fuel cell is an electric cell that converts the chemical energy of a fuel, typically hydrogen, directly into electric energy in a continuous process. Although fuel cells can be used with a variety of fuels and oxidants, they almost exclusively combine hydrogen and oxygen to form water vapor. Fuel cells include an anode in contact with the fuel, a cathode in contact with the oxygen and an electrolyte between the anode and cathode. Each cell typically creates less than one volt so that a series or stack of fuel cells are used to convert fuel into usable energy. Interconnect plates are used between each cell to keep the fuel and oxygen separated and to electrically connect the anode of one cell to the cathode of an adjacent cell.

One source of hydrogen is natural gas. A common way to obtain hydrogen from natural gas is by using a reformer which combines natural gas and steam at a high temperature, such as 760° C. Some fuel cells operate using a separate, external reformer to create the hydrogen; other fuel cells combine the function of a reformer into the fuel cell itself by operating the fuel cell at a high enough temperature, as well as other appropriate design considerations.

One type of fuel cell uses radial flow configurations. In one solid oxide fuel cell design, disclosed in M. Petrik et al., "Stack Development Status of the Interscience Radial Flow (IRF) SOFC", An EPRI/GRI Fuel Cell Workshop on Fuel Cell Technology Research and Development, Atlanta, Georgia, Mar. 22–23, 1994, the fuel and air are fed to each cell through a pair of holes at the center region of the cell. The fuel and air then flow radially outwardly to the edge of the cell. This flow configuration requires seals to segregate the fuel and air at the feed points and also runs the risk of temperature excursions at the center of the cell where both rich fuel and rich oxygen exist. In another configuration, disclosed in M. Prica et al., "Contoured PEN Plates for Improved Thermomechanical Performance in SOFCs", Proceedings of the Second European Fuel Cell Forum, Vol. 1, pp. 393–402, Oslo, Norway, May 6–10, 1996, the fuel and air are fed to the center of each cell through a pair of needles. These gases then flow radially to the cell edge. This flow configuration eliminates the gas seal requirement but still has problems with regard to temperature excursion. In another configuration, disclosed in European Patent 0,635, 896 A1, the fuel is fed to the center of the cell by a feed needle while air is fed to the entire cathode area by distribution nozzles. The spent fuel and spent air are collected at the cell edge. This configuration eliminates the need for a gas seal and does not have temperature excursion problems. It does, however, require a complex gas nozzle distribution system.

U.S. Pat. No. 5,851,689 discloses a radial flow fuel cell stack assembly in which the fuel gas is fed to the anode of each cell at positions located about a half way between the periphery and center of the cell by a pair of feed needles. From the needle tips, the fuel gas is split along circular paths by deflectors to flow circumferentially and both radially inwardly and outwardly. The air feed flows radially inwardly from the cell edge to the center of the cathode where the spent air is collected and discharged through a collection needle. This radial flow configuration eliminates the need for a gas seal. As no rich fuel and rich oxidant coexist at any point, it also eliminates the temperature excursion problem without the need for complex gas distribution nozzles. Due to the split fuel flow, portion of the spent fuel (which includes cell reaction product water and residual fuel) can be collected by a collection needle at the anode center to recycle the cell reaction product water as the steam source for reforming through an external ejector. Thus, no external steam generation and boiler feed water treatment are required once the fuel cell stack has reached operating temperature. The split fuel flow also distributes the fuel quickly to the entire cell area.

In the '689 patent, the radially inwardly moving air flow passes through a metal sponge ring around the stack to pick up heat radiated from the stack before it flows into the cells. This removes the waste heat generated in the stack and meanwhile preheats the air feed. The final heating of the air to the cell operating temperature is provided by direct combustion of spent fuel at the cell edge. The radial air flow toward the stack eliminates the need for a heat exchanger to preheat the air feed and helps to confine the stack heat to a hot core inside the metal sponge ring. Due to the heat confinement, the stack can be housed in a relatively low temperature enclosure with no significant heat losses.

SUMMARY OF THE INVENTION

The present invention is directed to a design of a fuel cell stack and system and also a method for operating the fuel cell stack and system. The fuel cell stack includes at least first and second cells and a separator assembly. Each cell includes an anode, a cathode and electrolyte between the anode and cathode. The separator assembly has a fuel side and an oxidant side. The separator assembly also includes an anode spacer element between the fuel side and the anode of the first cell and a cathode spacer element between the oxidant side and the cathode of the second cell. The separator assembly further includes a cathode exhaust passageway between the oxidant side and the cathode of the second cell, and an anode feed passageway and an anode exhaust passageway between the fuel side and the anode of the first cell.

According to one aspect of the invention, a gas deflector, which is spaced apart from and overlying the anode separator element, is used to help prevent generally radially inwardly moving oxygen-containing gas, typically air, from contacting the anode while permitting the oxygen-containing-gas access to the peripheral edge of the cathode spacer element. This aspect of the invention helps to eliminate one of the potential problems with the system describe in the '689 patent. That is, the system of the '689 patent may require relatively precise manufacturing of the fuel cell stacks to help ensure that the fuel gas and air are distributed uniformly in all radial directions; without such uniformity, air could intrude to the anode side to oxidize the anode and spent fuel, including residual fuel, could intrude to the cathode side to reduce the cathode. This undesirable electrode oxidation or reduction can quickly cause the stack to fail. However, with this aspect of the present invention, an air deflector forms a shield or barrier to help prevent undesired gas intrusion into the electrodes and thus helps reduce the need for high manufacturing precision in the manufacture of the stack.

Another aspect of the invention involves the use of a generally continuous loop (typically circular) anode feed tube spaced apart from the cell peripheral edge, the feed tube having a plurality of fuel outlets therealong. Fuel outlets are preferably oriented to be radially inwardly and radially outwardly directed. This aspect of the invention provides an advantage over the invention of the '689 patent because it eliminates the need to use corrugated separator plates to form the necessary flow channels for the fuel gas. This aspect of the invention also eliminates the relatively large clamping forces needed to tightly press corrugated separator plates against the cells to create the desired fuel paths, such clamping force having the potential to cause the cells to crack. This is particularly true for solid oxide cells made of brittle ceramic materials.

A third aspect of the invention is directed to the use of an anode recycle passageway having a recycle inlet fluidly coupled to spent fuel, including residual fuel and cell reaction product water, at the anode central region and a recycle outlet located at a recycle position within the anode feed passageway so that the cell reaction product water can be used as a steam source for reforming. Using such internal reforming eliminates the need for reforming using, for example, an external ejector.

A further aspect of the invention is directed to a fuel cell system in which a number of fuel cell assemblies are housed within a common enclosure. Air or other oxygen-containing gas is supplied to the enclosure. The fuel cell assemblies are each coupled to a fuel supply line and a cathode exhaust line to permit fuel to be supplied to and cathode exhaust to be removed from the fuel cell assemblies.

The invention also relates to methods for operating a fuel cell stack. In a first method, oxygen-containing gas is flowed generally radially inwardly towards the peripheral edges of the cathodes. The oxygen-containing gas is deflected away from the anode peripheral edges. Fuel is fed to the anodes to a position spaced apart from the peripheral edge of each anode. A second method involves flowing an oxygen-containing gas generally radially inwardly to the peripheral edges of the cathodes of the fuel cell stack and feeding a fuel between the anode peripheral edge and the anode central region by flowing the fuel generally radially inwardly and outwardly using a generally continuous loop anode feed tube, having fuel outlets therealong, the anode feed tube located spaced apart from the anode peripheral edge and the anode central region.

In a third method oxygen-containing gases flow generally radially inwardly to the peripheral edges of the cathodes of the fuel cell stack; fuel is fed to the anodes at positions spaced apart from the central region so that spent fuel, including residual fuel and cell reaction product water, flows radially inwardly and outwardly. The spent fuel at the anode central region is recycled using anode recycle passageways. The spent fuel flows through the recycle passageway to an ejector to mix with the flow of fuel passing along the anode feed passageway. This method provides internal reforming of the hydrocarbon fuel within the fuel cell stack. This distribution of the fuel helps prevent local overcooling by the highly endothermic reforming reaction so to permitting the internal reforming.

The present invention provides a system which is relatively simple in design, low in cost and high in reliability. The assembly is designed to have no gas leakage; cell cracking and other cell damage is minimized and the simplicity of the entire system is greatly enhanced by its design. In addition to the above mentioned features and advantages, the present invention provides many of the advantages of the invention of the '689 patent. In particular, various embodiments of the present invention requires no gas seal, no large axial clamping force, no separate air pre-heater, no external reformer or performer and no external steam supply for reforming.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
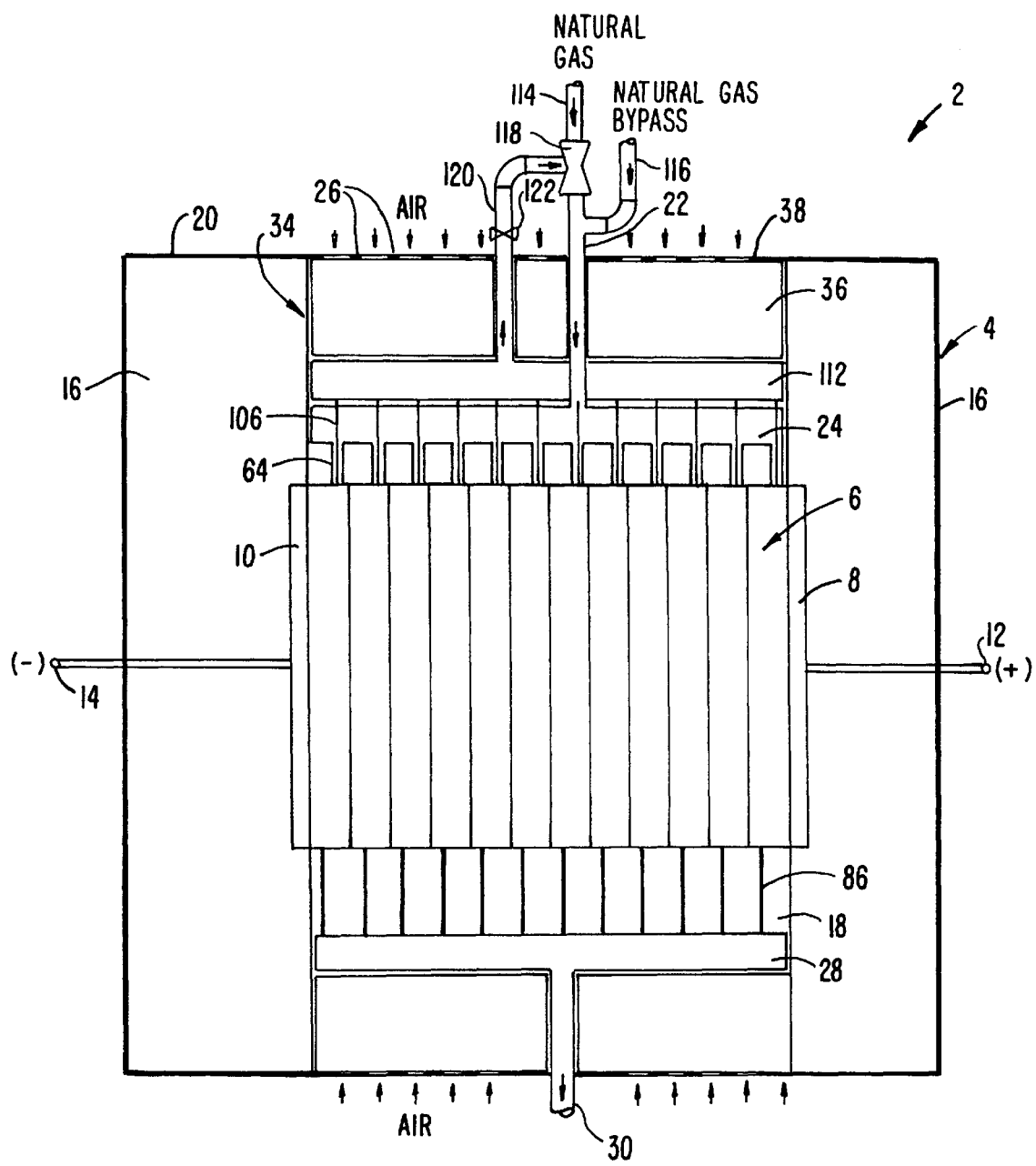
FIG. 1 is a simplified overall cross sectional view of a fuel cell assembly made according to the invention.

FIG. 1 is a simplified overall cross sectional view of a fuel cell assembly 2 made according to the invention. Assembly 2 will initially be described in its steady-state condition; later, start-up procedures will be described.

Fuel cell assembly 2 includes a housing 4, typically made of steel, containing a fuel cell stack 6 therein. Fuel cell stack 6 includes many alternating cells and separator assemblies discussed below. Each end of fuel cell stack 6 includes an electrically conductive end plate 8, 10, end plate 8 being coupled to a positive terminal 12 with end plate 10 being coupled to a negative terminal 14. Fuel cell stack 6, when operating, generates a substantial amount of heat. Electrical and thermal insulation element 16 is provided at each end plate 8, 10 to provide electrical and thermal isolation of housing 4 from fuel cell stack 6. Elements 16 define the ends of a cylindrical enclosed area 18 within the cylindrical sidewall 20 of housing 4.

Fuel, typically in the form of natural gas or another hydrocarbon gas, is supplied to fuel cell stack 6 through a fuel inlet 22 and then to an anode feed (fuel) manifold 24 and then to a series of anode feed passageways 64. In addition to fuel, fuel cells require a source of oxygen, typically air. Air is supplied to cylindrical enclosed area 18 through numerous perforations 26 formed in a perforated section 38 of cylindrical sidewall 20. Fuel cell stack 6 creates cathode exhaust, also called flue gas, as a result of the operation of the fuel cell. The cathode exhaust is primarily air with part of the oxygen removed by the fuel cell. The cathode exhaust is collected from fuel cell stack 6 by a series of cathode exhaust passageways 86 which connect to a cathode exhaust manifold 28, the manifold being coupled to a cathode exhaust outlet 30. The cathode exhaust is typically quite hot so that all or part of the exhaust may be used in a heat exchanger to help extract the heat for other uses, including preheating of fuel as discussed below with reference to FIG. 9. Alternatively, it can simply be exhausted to the atmosphere.

Assuming a hydrocarbon gas rather than hydrogen is used as the fuel, some type of reforming is necessary. The present invention preferably uses internal reforming. The specifics of the structure used for internal reforming within fuel cell assembly 2 will be described below.

With the present invention some of the fuel is not consumed by fuel cell stack 6 but rather escapes from the periphery of the fuel cell stack where it combines with air to combust. However, the amount of oxygen consumed in burning off the residual fuel is sufficiently small to leave quite adequate amounts of oxygen for use by fuel cell stack 6.

Figure 2:
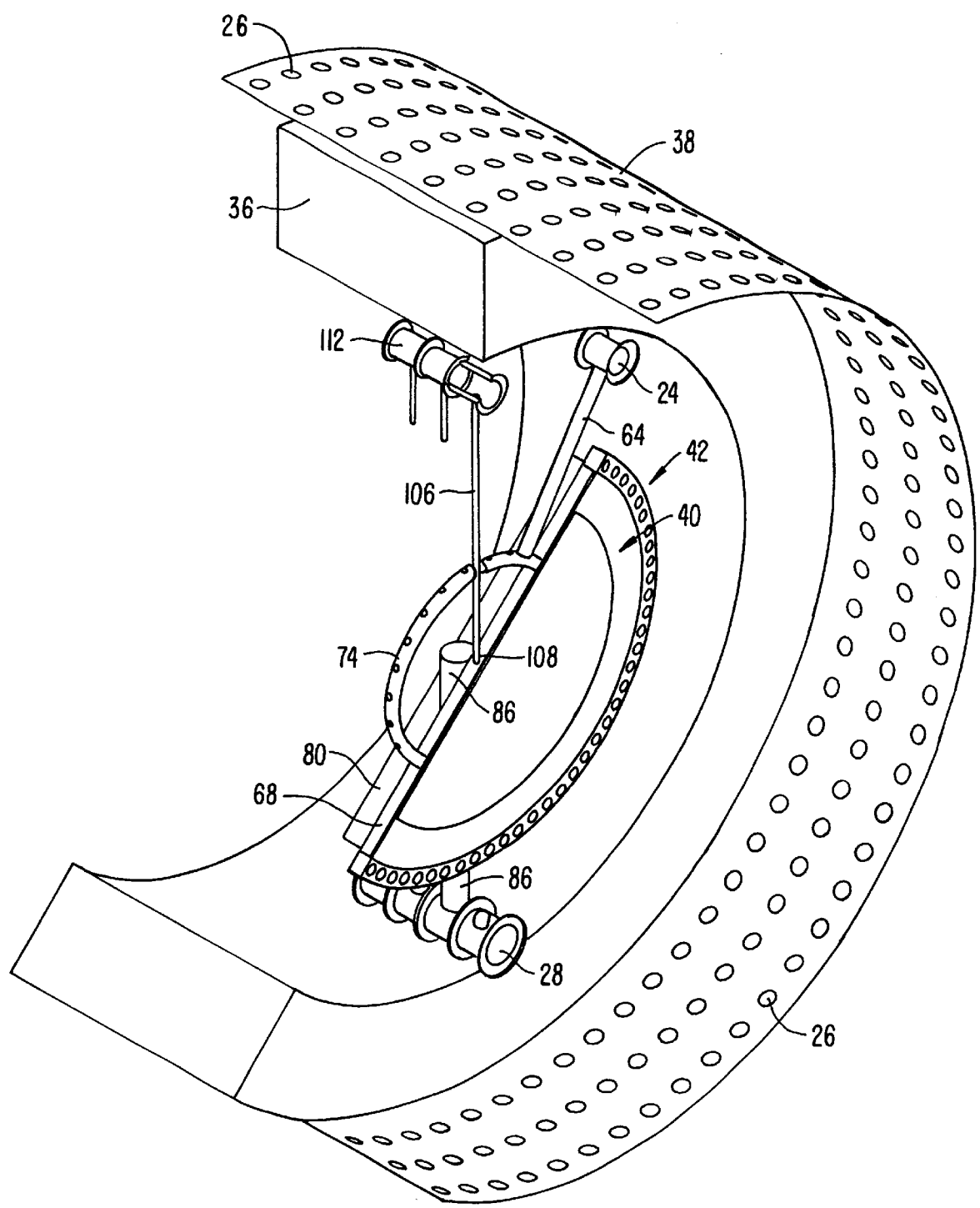
FIG. 2 is a partial cross sectional isometric view of one spacer assembly, one cell, and a portion of the porous housing, including the metal sponge layer and perforated sleeve.

The air reaching fuel cell stack 6 is preheated as it passes through a porous housing 34, typically made from a generally cylindrical metal sponge member 36 surrounded by the perforated section 38 of cylindrical sidewall 20. See FIGS. 1 and 2. Metal sponge member 36 is typically made of stainless steel while perforated section 38 is typically made of stainless steel with 1 to 10 mm diameter holes formed over the entire surface of perforated section 38. Member 36 could be made from other materials, such as ceramic sponge, while perforated section 38 could be made of, for example, solid or fibrous ceramic material.

Figure 4:
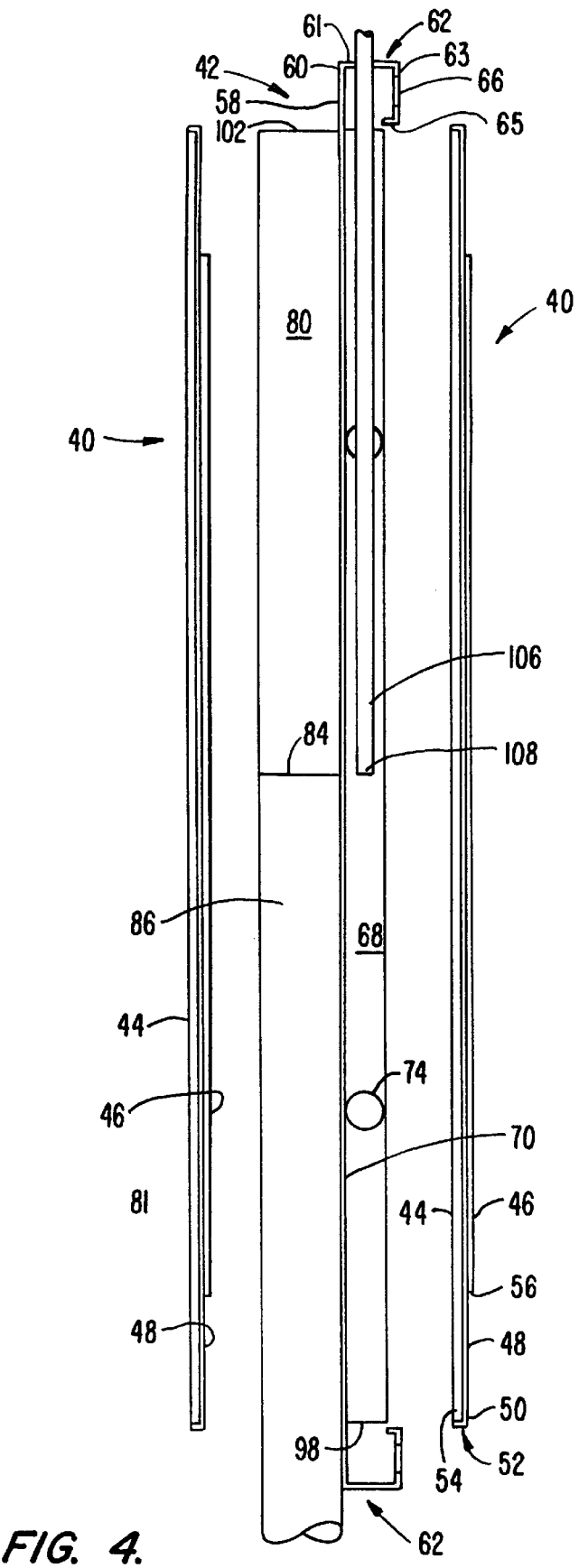
FIG. 4 is a simplified vertical side cross sectional view of a separator assembly and two cells.
Figure 5:
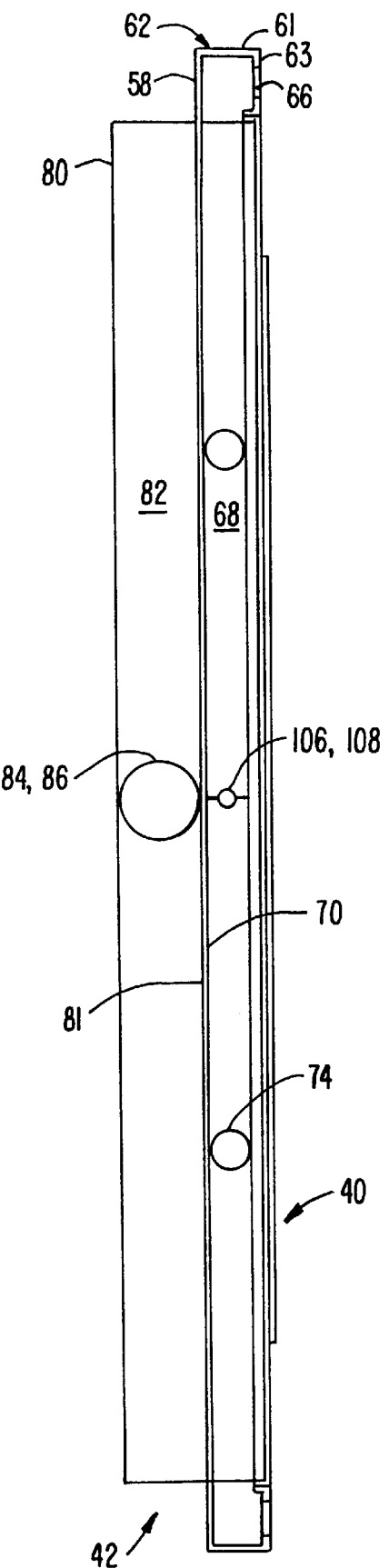
FIG. 5 is a horizontal cross sectional view of the separator assembly and cell of FIG. 2.

Fuel cell stack 6 includes many, typically about 50 to 300, alternating cells 40 and separator assemblies 42. See FIGS. 3, 4 and 5. Each cell 40 includes an anode 44, a cathode 46 and an electrolyte 48 separating the anode and cathode. Cell 40 has a circumferential edge 50 defined by an extension or lip 52 of electrolyte 48 which covers the peripheral edge 54 of anode 44. Each cell 40 is typically about 7.5 to 50 cm in diameter. The peripheral edge 56 of cathode 46 is set back or spaced apart from cell peripheral edge 50 by about 0.1 to 1 mm for reasons to be discussed below.

Separator assembly 42 includes a disc-shaped fluid separator 58, typically made of stainless steel, having a separator peripheral edge 60 from which an air deflector 62 extends at a right angle. Tubular anode feed passageway 64 extends from fuel manifold 24 and passes through a hole formed in air deflector 62.

Deflector 62 has a generally L-shaped cross-sectional shape and including an axially-extending portion 61, a radially-inwardly extending portion 63 and an inwardly-turned lip 65. Cell 40 is supported by lip 65. Axially-directed holes 66 are formed in portion 63. Deflector 62 helps to prevent air from contacting anode 44 as discussed below. Portions 61, 63 could have shapes other than those disclosed; for example, portions 61, 63 could be formed by a single continuously-curving member.

Separator assembly 42 further includes a fluid permeable anode spacer element 68, typically made of a metal felt.

Anode spacer element 68 is supported at the fuel side 70 of separator 58 by the interengagement with a circular continuous loop anode feed tube 74 mounted to the lower end of anode feed passageway 64. Fuel is supplied to the region between fuel side 70 and anode 44, that is to anode spacer element 68, by anode feed tube 74. Anode feed tube 74 includes radially inwardly and outwardly directed fuel outlets 76, 78.

Separator assembly 42 also includes a cathode spacer element 80 which is also fluid permeable and is preferable made of a metal felt. Cathode spacer element 80 is supported at the oxidant side 81 of fluid separator 58 by a vertically-extending cathode exhaust passageway 86. Anode and cathode spacer elements 68, 80, in combination with fluid separator 58, provide the desired spacing to permit fluid flow therethrough and to make electrical connection between the anodes 44 and cathodes 46 of adjacent cells 40.

The exhaust inlet 84 at the upper end of tubular cathode exhaust passageway 86 is located at the central region 82 of cathode spacer element 80. Cathode exhaust passageway 86 has its lower end mounted to cathode exhaust manifold 28 to permit cathode exhaust at central region 82 to be exhausted from fuel cell assembly 2. Cathode exhaust manifold 28 is formed with periodic corrugations 88 to accommodate its axial expansion and contraction, which occurs when cathode exhaust, typically at about 870° C. (1600° F.), starts and stops passing through exhaust manifold 28. Cells 40 and separator assemblies 42 essentially hang from manifold 24 by anode feed passageways 64.

Cathode spacer element 80 could also be secured directly to oxidant side 81 of separator 58, such as brazing, fusing or other suitable techniques. In this case, the assembly of cell 40 and separator assembly 42 would be supported by cathode exhaust manifold 28 through cathode exhaust passageway 86 rather than supported by anode fuel manifold 24 through anode fuel passageway 64.

Figure 8:
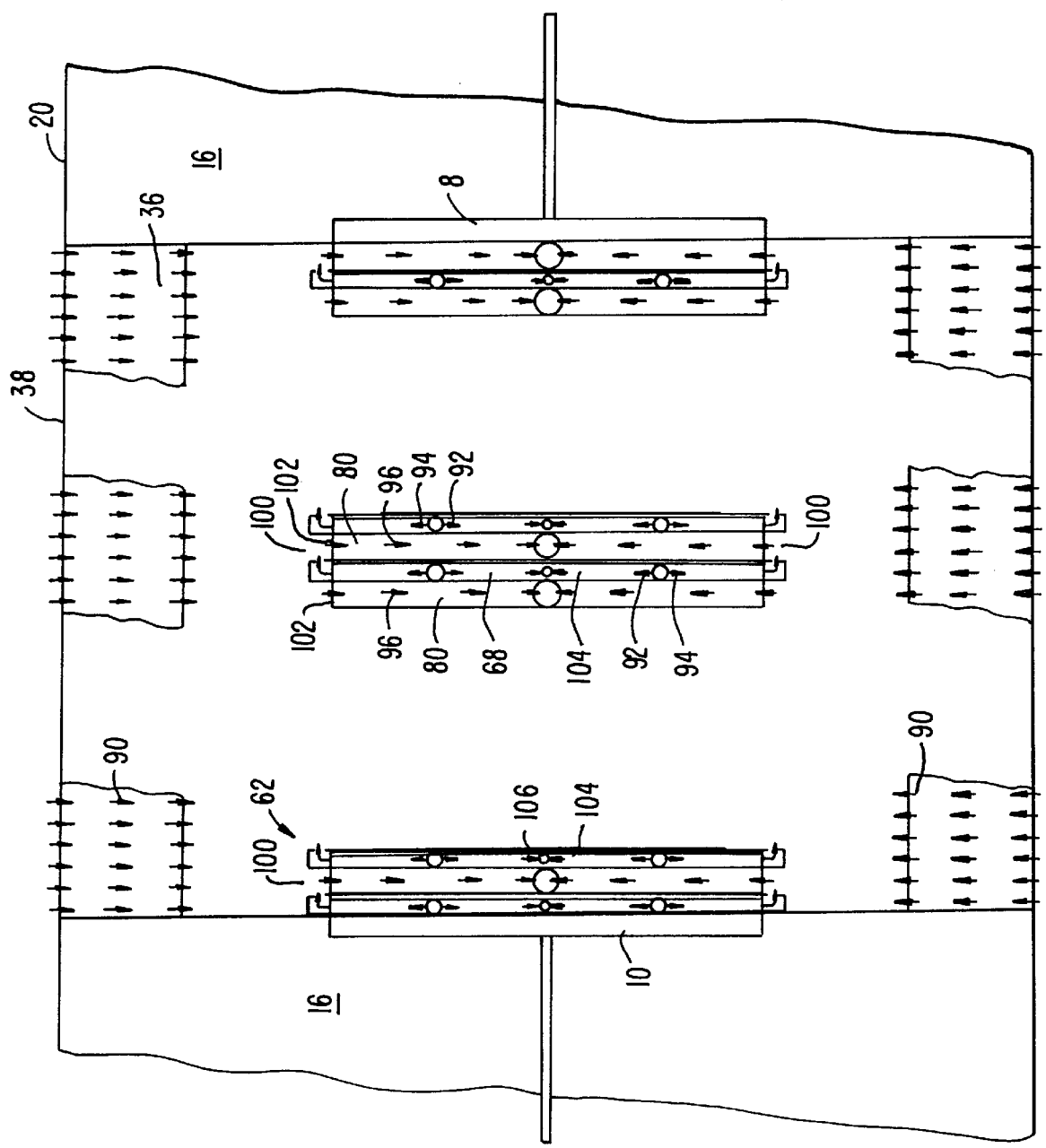
FIG. 8 illustrates the direction of movement of fuel, spent fuel and air as viewed from a horizontal cross sectional view of two cells and two separator assemblies at the center of the stack with one complete cell and separator assembly at either end of the stack along with a partial separator assembly adjacent to the end plates at each end of the stack.

FIG. 8 illustrates the general gas flow patterns for fuel cell assembly 2. Arrows 90 indicate the passage of air through perforated section 38 and then through metal sponge member 36. Passing through metal sponge member 36 causes the air to be preheated. Fuel gas passes both radially inwardly and outwardly from fuel outlets 76, 78 formed in anode feed tube 74. This is indicated by arrows 92 (radially inwardly) and arrows 94 (radially outwardly). Accordingly, fuel is provided to anodes 44. On the other (cathode) side of fluid separator 58 air passes into cathode spacer element 80 as indicated by radially inwardly directed arrows 96.

As discussed above, it is important to prevent oxygen-containing air from contacting anode 44 and to prevent spent fuel from contacting cathode 46. A primary way air is prevented from contacting anode 44 is through the use of air deflectors 62. Air deflectors 62 lie radially outwardly of, generally overlie and substantially shield the outer peripheral edges 98 of anode spacer elements 68. Spent fuel, that is cell reaction product water and residual fuel, exits outer peripheral edge 98, passes through holes 66 and contacts the pre-heated, radially inwardly moving air 90 to combust in a region 100 radially outwardly of the outer peripheral edge 102 of cathode spacer element 80. This combustion of the residual fuel helps to preheat the air entering cathode spacer element 80.

As discussed above, virtually all fuel cells use hydrogen as the final fuel. However, many fuel cells operate using a hydrocarbon gas, such as natural gas, as the fuel but need to first break the hydrocarbon gas down to release the hydrogen in the reforming process. This typically takes place at high temperatures, such as 1200–1800° F. (650–980° C.), using steam. The preferred embodiment of the invention recycles a portion of the spent fuel that reaches the central region 104 of anode spacer element 68 using a tubular anode recycle passageway 106.

Figure 6:
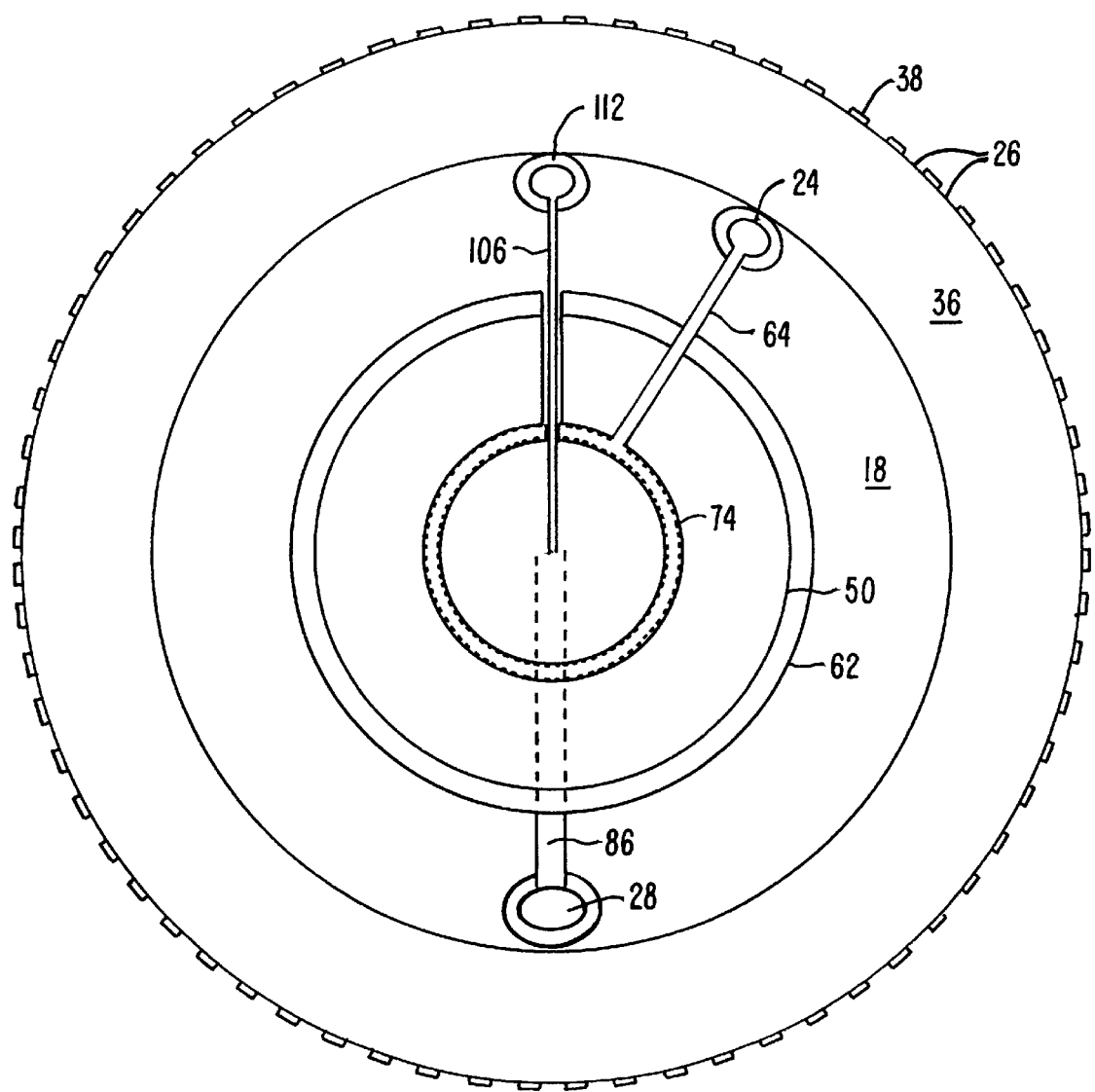
FIG. 6 is a simplified end view of the fuel cell assembly of FIG. 1 taken between the anode spacer element and the anode of a cell.
Figure 7:
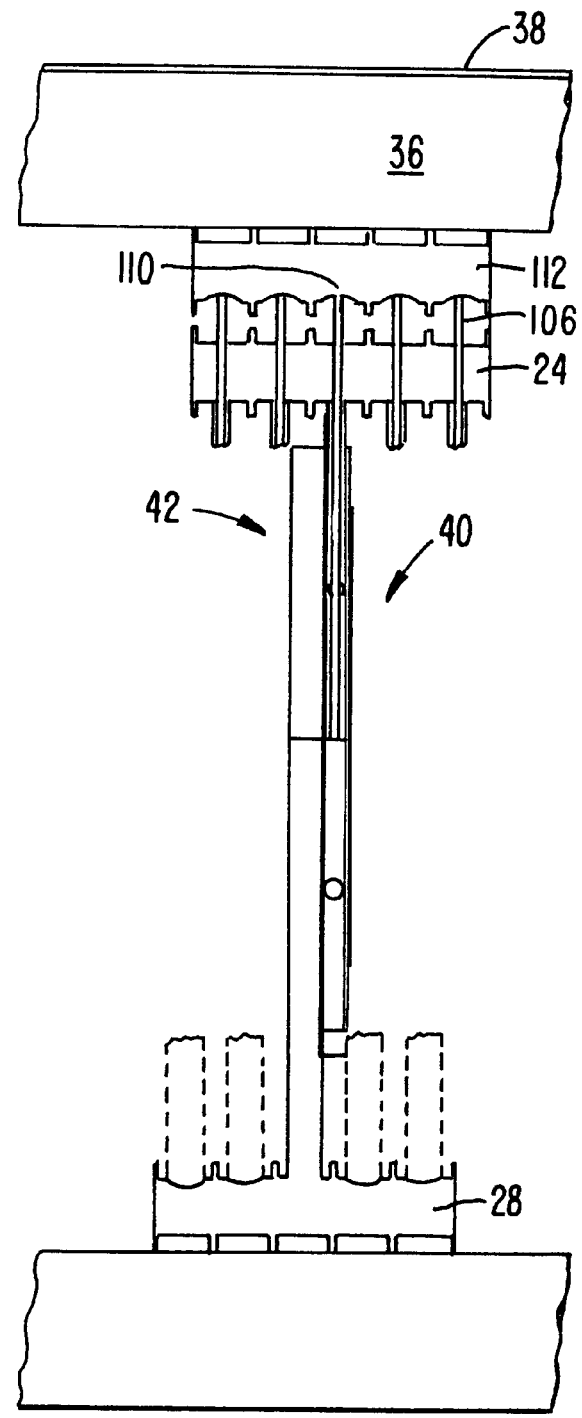
FIG. 7 is a vertical cross sectional view of a separator assembly and one cell of the fuel cell assembly of FIG. 1.

Referring now to FIGS. 1, 6 and 7, anode recycle passageway 106 has a recycle inlet 108 at central region 104 and a recycle outlet 110 opening into an anode recycle manifold 112. Fuel is supplied to fuel inlet 22 through a main line 114 and a bypass line 116. A venturi-type ejector 118 is positioned along main line 114 and is used to draw spent fuel, that is residual fuel and cell reaction product water (in the form of steam at the operating temperatures of assembly 2), from anode recycle manifold 112, along connector line 120 and into main line 114 at ejector 118. The flow of fuel along lines 114, 116 is controlled to maintain proper operation of fuel cell assembly 2 as discussed in more detail below. The steam mixes with the hydrocarbon fuel creating hydrogen in a reforming reaction within housing 4. By the appropriate choice of flow rates and similar considerations, efficient and effective internal reforming can be achieved.

Figure 3:
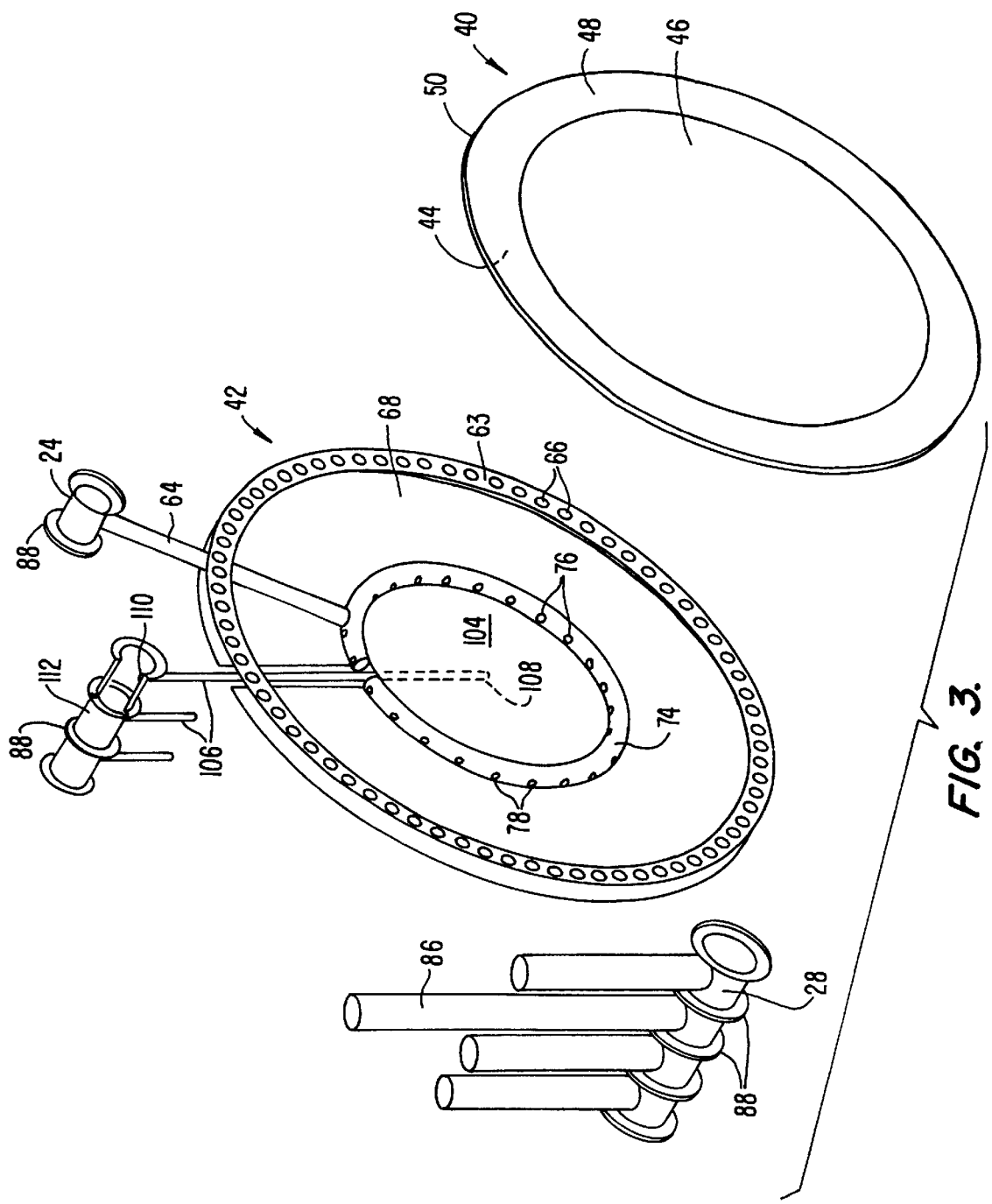
FIG. 3 is a partially exploded isometric view of a cell spaced apart from a separator assembly, the separator assembly including an anode spacer element with a continuous loop anode feed tube embedded therein.

As shown in FIG. 3, anode feed manifold 24 and anode recycle manifold 112 also include periodic corrugations 88. This is important, because manifolds 24, 28 and 112 are all secured at their ends by housing 4. By providing for expansion and contraction through corrugations 88, the axial locations of anode feed passageways 64, cathode exhaust passageways 86 and anode recycle passageways 106 do not move relative to or create mechanical interference with respect to cells 40 and separator assemblies 42.

Anode feed passageway 64, anode feed tube 74, anode recycle passageway 106, and cathode exhaust passageway 86 are all coated with electrical insulation material for electrical isolation from cell 40, fluid separator 58, anode spacer element 68 and cathode spacer element 80.

Air passes through perforations 26 and is preheated by the heat dissipated from fuel cell stack 6 as it passes through porous housing 34. Fuel gas is fed to anode 44 of each cell by passing through a fuel inlet 22, to fuel manifold 24 and then to the individual anode feed passageways 64 which terminate at feed tubes 74. The fuel gas flows radially inwardly through fuel outlets 76 and radially outwardly through fuel outlets 78. The fuel passes through porous anode spacer element 68 which provides for gas passage and for the spacing of and the electric connection between fuel separator 58 and anode 44. To help ensure that spent fuel does not have a chance to contact and reduce cathode 46, peripheral edge 56 of cathode 46 is set back from cell peripheral edge 50. The residual fuel of the radially outwardly flowing spent fuel combusts when it contacts the heated air passing through porous housing 34 in region 100 between outer peripheral edge 102 of cathode spacer element 80 and metal sponge member 36. This burning of the residual fuel helps to bring the incoming, preheated air to the proper operating temperature for fuel cell stack 6. The oxygen content in the incoming air is substantially more than is required to burn off residual fuel. Thus, the hot gas from this combustion still has sufficient oxygen content for the cell reaction. This properly heated air flows into cathode spacer element 80 through outer peripheral edge 102 as the oxidant gas feed. The oxidant gas flows radially towards central region 82 of element 80 for collection by the exhaust inlet 84 of cathode exhaust passageway 86.

The cathode exhaust passageways 86 are all connected to cathode exhaust manifold 28 which in turn is connected to cathode exhaust outlet 30. Cathode spacer element 80 not only provides spacing and porous gas passage for the oxidant gas flow but it also provides electric connection between fluid separator 58 and cathode 46. Spent fuel at central region 104 of anode spacer element 68 is collected through the recycle inlet 108 of anode recycle passageway 106 where the spent fuel flows upwardly through the recycle passageway and into anode recycle manifold 112 where it is drawn into the flow of fuel along line 114 by ejector 118. This eliminates the need for an external steam supply for reforming the fuel gas into hydrogen.

Figure 9:
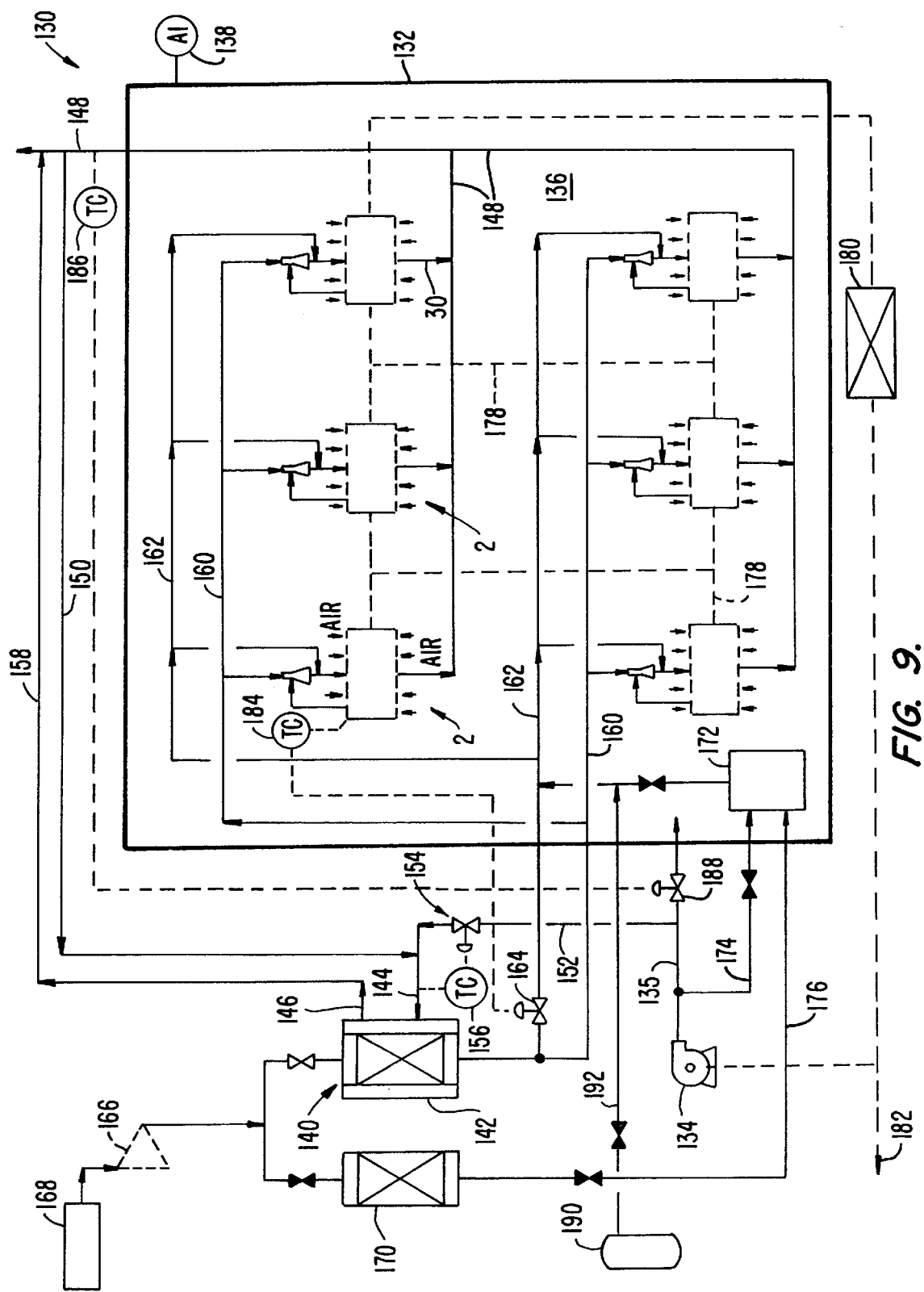
FIG. 9 is a schematic illustration of a fuel cell system or fuel cell plant in which several of the assemblies of FIG. 1 are contained within a common enclosure.

FIG. 9 illustrates a fuel cell system 130 using, in this example, six fuel cell assemblies 2 within an enclosure 132. Air supplied from a blower 134 is fed into enclosure 132 through a line 135, sweeps through the interior 136 of the enclosure, and finally enters each fuel cell assembly 2 through the perforations 26 in sidewall 20 of housing 4. The air sweep through the enclosure interior prevents any accumulation of hydrogen, natural gas or other fuel leaked from the fuel cell assemblies 2. A gas analyzer 138 is preferably provided to continuously monitor the gas composition in enclosure 132. Upon detection of significant accumulation of combustible gases in enclosure 132, the fuel feed is cut off and system 130 is shut down.

The natural gas feed is desulfurized in a high temperature desulfurizer 140 containing ZnO catalyst. In desulfurizer 140, the catalyst bed sits inside a heating jacket 142 of desulfurizer 140. Heating jacket 142 has an inlet 144 and an outlet 146. Inlet 142 is connected to a cathode exhaust line 148 passing from enclosure 132, line 148 connected to cathode exhaust outlets 30 of fuel cell assemblies 2 by an exhaust feed line 150. This permits a portion of the hot flue gas from fuel cell 130 to heat the catalyst bed to the required operation temperature, typically 750° F. (400° C.). As the fuel cell module flue gas may be hot enough (typically about 1600° F. (870° F.) to cause natural gas (or other hydrocarbon fuel) to crack and form carbon deposits in the catalyst bed, the flue gas temperature is lowered to, for example, 1000° F. (540° C.) by mixing with a portion of the air supplied from blower 134, through a line 152, through a temperature controlled valve 154 and to exhaust feed line 150. A temperature controller 156 monitors the temperature of the gas entering inlet 144 and adjusts valve 154 to ensure the proper temperature for gas entering heating jacket 142. Outlet 146 of heating jacket 142 is connected to cathode exhaust line 148 downstream of line 150 by a line 158 so that exhaust gas from heating jacket 142 joins the remaining fuel cell module flue gas exiting system 130 to vent to the atmosphere or to, for example, generate steam or hot water.

Fuel from desulfurizer 140 (when used) is fed to main lines 114 of assemblies 2 by a first fuel line 160 and to bypass lines 116 by second fuel line 162. In the preferred embodiment ejector 118 has essentially no turndown capability so the fuel feed to the ejector is kept constant. Any fuel flow change due to the load change is provided by throttling a flow control valve 164 on second fuel line 162. Typically, one third of the, for example, natural gas fuel is fed to each ejector 118 and two thirds bypass through line 116 during full power operation. Thus, in this embodiment the fuel cell system 130 has a minimum plant load of about 33%. Check valve 122 is provided along line 120 to prevent gas backflow during the startup of ejector 118.

For the fuel gas to be the motive gas for ejector 118, it has to have a minimum pressure of, for example, 80 psia (5.5 kg/cm² a). If the fuel gas supply pressure is below the required level, then a gas compressor 166 needs to be used.

During startup, no hot flue gas from fuel cell system 130 is available to operate high temperature desulfurizer 140.

Therefore a low temperature desulfurizer 170 may be required for the fuel from fuel source 168. Low temperature desulfurizer 170 is operated at room temperature based on the use of, for example, an activated carbon bed.

During the startup, air from blower 134 and a fuel gas stream from low temperature desulfurizer 170 are fed to a partial oxidizer 172 through lines 174, 176. Air along line 135 and fuel gas from partial oxidizer 172 are fed to interior 136 and to second fuel line 162 in the same fashion as described above for the normal operation except that no power is drawn from fuel cell stacks 6. Each fuel cell stack 6 is heated up by using hot gas generated from burning fuel with air in regions 100. An electric spark type igniter, not shown, or other appropriate device, provides the initial ignition. As no cell reaction takes place during startup, no cell reaction product water or hydrogen is generated or recycled. To prevent a hydrocarbon fuel from thermal cracking to carbon, partial oxidizer 172 is preferably used during this initial startup to supply a hydrogen and water containing fuel gas to line 162. Other sources of startup hydrogen could also be used.

When the stack is heated to 1000° F. (540° C.), current can be drawn to induce self-heating of the stack. When the stack reaches the 1600° F. (870° C.) operating temperature, the partial oxidizer 172 is be turned off and the fuel is fed to first and second fuel lines 160, 162 through high temperature desulfurizer 140.

The fuel cell assemblies 2 are electrically connected in series to build up voltage. However, they are also connected in parallel so that the malfunction of one stack will not force an entire train of stacks to shut down. These electrical connections are suggested by dashed lines 178. The DC power produced from the stacks is converted to AC power in an inverter 180. After extracting part of the AC power produced for in-plant uses, such as that required for the blower 134, the net is exported to the customer or the grid at 182.

During the normal operation, the cathode inlet temperature at region 100, sensed by one or more temperature controllers 184, is used to control the fuel feed flow by controlling valve 164; the cathode exhaust temperature, sensed by temperature controller 186 along exhaust feed line 148, is used to control the air feed flow to the stacks by controlling a flow control valve 188 along line 135. The fuel and air flow requirements are a function of the changes of various factors including plant load, ambient temperature, natural gas (or other fuel) composition, air humidity, and stack age. The control approach used allows an automatic adjustment of the fuel and air feed flows for these changes.

When the cathode inlet temperature sensed by temperature controller 184 is higher than the design set point, it means there is too much spent fuel available in the anode exhaust for combustion at region 100. Thus, the fuel feed has to be cut back. When the opposite happens, the fuel feed has to be increased. When the cathode outlet temperature, sensed by temperature controller 186, is higher than the design set point, it means that there is not sufficient air fed to carry away waste heat from the stack assembly. Thus, the air feed from blower 134 has to be increased. When the opposite happens, the air feed has to be cut back.

To shut down the plant, the fuel gas feed to the stack is cut off and replaced by a small stream of purge nitrogen from a nitrogen source 190 through a line 192. The nitrogen purge prevents the anodes from oxidation when the fuel flow is not present. Meanwhile, the air flow is kept flowing to cool the stacks. When the stacks are cooled to room temperature, the air flow is cut off and the whole interior 136 of enclosure 132 is filled with nitrogen.

Cells 40 and separator assemblies 42 are loosely packed when assembled. Fuel cell stack 6 heats up and reaches its operating temperature of about 1600° F. (870° C.). However, shell 4 does not expand thermally because it is constantly flushed with cool feed air from blower 134. This forces cells 40 and separator assemblies 42 to expand against each other to cause fuel cell stack 6 to be self clamped without the need for a clamping spring or other clamping structure.

Modification and variation can be made to the disclosed embodiments without departing from the subject of the invention as defined in the following claims. For example, anode feed tube 74 need not be a continuous loop feed tube but could consist of, for example, two or more arcuate tube sections creating a generally continuous anode feed tube; a plurality of anode feed passageways 64 could be used to feed fuel to separate sections of anode feed tube 74. Instead of metal felt for spacer elements 68, 80, other structure which provides the desired characteristics, including fluid permeability and electrical conduction, could be used; for example fluid separator could be provided with appropriately configured corrugations, dimples or extensions. Also, the number of cells 40 and dimensions of various elements can vary substantially from the exemplary numbers and dimensions recited above.

Any and all patents, patent applications and printed publications referred to above are incorporated by reference.

What is claimed is:

1. A fuel cell stack comprising:
   at least first and second cells and a separator assembly;
   said cells each comprising:
     an anode;
     a cathode;
     an electrolyte between the anode and the cathode; and
     a cell peripheral edge;
   said separator assembly comprising:
     a fluid separator having a fuel side and an oxidant side and a separator peripheral edge;
     an anode spacer element, having an anode spacer peripheral edge, between the fuel side and the anode of the first cell;
     a cathode spacer element, having a cathode spacer peripheral edge, between the oxidant side and the cathode of the second cell;
     a cathode exhaust passageway having an exhaust inlet between the oxidant side and the cathode of the second cell; and
     an anode feed passageway having a fuel outlet between the fuel side and the anode of the first cell spaced-apart from the anode spacer peripheral edge so that spent fuel, including residual fuel, can move outwardly and pass through the anode spacer peripheral edge; and
   a gas deflector spaced-apart from and overlying the anode spacer peripheral edge to help prevent generally radially inwardly-moving oxygen-containing gas from contacting the anode while permitting the generally radially-inwardly moving oxygen-containing gas access to the cathode spacer peripheral edge.

2. The fuel cell stack according to claim 1 wherein said cathode is spaced apart from the cell peripheral edge to help prevent residual fuel from contacting the cathode.

3. The fuel cell stack according to claim 1 wherein said anode has an anode peripheral edge, and further comprising a barrier contacting the anode peripheral edge to help prevent generally radially inwardly-moving oxygen-containing gas from contacting the anode.

4. The fuel cell stack according to claim 1 wherein the deflector is a one-piece extension of the separator.

5. The fuel call stack according to claim 1 wherein the deflector extends from the separator peripheral edge in both axial and radially-inward directions.

6. The fuel cell stack according to claim 1 wherein the deflector comprises generally axially-directed holes formed therethrough through which residual fuel can flow.

7. The fuel cell stack according to claim 1 wherein at least one of the anode and cathode spacer elements comprises fluid-permeable metal felt.

8. The fuel cell stack according to claim 1 wherein the oxygen-containing gas is other than substantially pure oxygen.

9. The fuel cell stack according to claim 1 wherein the oxygen-containing gas is air.

10. The fuel cell stack according to claim 1 wherein the anode comprises an anode central region and the cathode comprises a cathode central region.

11. The fuel cell stack according to claim 10 wherein the cathode exhaust inlet is located at the cathode central region.

12. The fuel cell stack according to claim 10 further comprising an anode recycle passageway having a recycle inlet fluidly coupled to spent fuel, including cell reaction product water, at the anode central region and a recycle outlet fluidly coupled to the anode feed passageway.

13. The fuel cell stack according to claim 12 further comprising means for causing spent fuel, including cell reaction product water from the anode central region, to flow into the recycle inlet, along the anode recycle passageway, out the recycle outlet and into a flow of fuel passing into the anode feed passageway towards the fuel outlet so that the cell reaction product water can be used as a steam source for reforming.

14. The fuel cell stack according to claim 12 wherein the recycle outlet is fluidly coupled to the anode feed passageway through an ejector.

15. A fuel cell assembly comprising:
a fuel cell stack of claim 1; and
a housing containing the fuel cell stack, the said housing comprising a gas-permeable, porous wall surrounding the cell peripheral edges, said porous wall fluidly coupled to a source of an oxygen-containing gas.

16. The fuel cell assembly according to claim 15 wherein the housing further comprises a metal sponge member within and adjacent to the porous wall, said metal sponge member acting to pre-heat gas flowing towards the fuel cell stack.

17. The fuel cell assembly according to claim 16 wherein the fuel cell stack comprises a plurality of said separator assemblies and said cells, and further comprising a manifold fluidly coupled to a chosen one of the cathode exhaust, anode recycle and anode feed passageway of each said separator assembly.

18. The fuel cell assembly according to claim 17 wherein said manifold comprises thermal expansion elements.

19. A fuel cell stack comprising:
at least first and second cells and a separator assembly;
said cells each comprising:
an anode;
a cathode;
an electrolyte between the anode and the cathode; and
a cell peripheral edge; and
said separator assembly comprising:
a fluid separator having a fuel side and an oxidant side and a separator peripheral edge;
an anode spacer element between the fuel side and the anode of the first cell;
a cathode spacer element between the oxidant side and the cathode of the second cell;
a cathode exhaust passageway having a catheter exhaust outlet and a catheter exhaust inlet between the oxidant side and the cathode of the second cell; and
an anode feed passageway having a fuel inlet and a generally continuous-loop anode feed tube spaced apart from the cell peripheral edge and located between the fuel side and the anode of the first cell; and
the anode feed tube having a plurality of fuel outlets therealong.

20. The fuel cell stack according to claim 19 wherein the cell peripheral edge is circular and the generally continuous-loop anode feed tube is a circular continuous-loop anode feed tube.

21. The fuel cell stack according to claim 20 wherein the circular continuous-loop anode feed tube has a circular cross-sectional shape.

22. The fuel cell stack according to claim 19 wherein the fuel outlets comprise radially inwardly and radially outwardly directed fuel outlets.

23. A fuel cell assembly comprising:
a fuel cell stack of claim 19; and
a housing containing the fuel cell stack, the housing comprising a gas-permeable, porous wall surrounding the cell peripheral edges, said porous wall fluidly coupled to a source of an oxygen-containing gas.

24. A fuel cell stack comprising:
at least first and second cells and a separator assembly;
said cells each comprising:
an anode comprising an anode central region;
a cathode comprising a cathode central region;
an electrolyte between the anode and the cathode; and
a cell peripheral edge; and
said separator assembly comprising:
a fluid separator having a fuel side and an oxidant side and a separator peripheral edge;
an anode spacer element, made of a fluid-permeable material, between the fuel side and the anode of the first cell;
a cathode spacer element, made of a fluid-permeable material, between the oxidant side and the cathode of the second cell;
a cathode exhaust passageway having an exhaust outlet and an exhaust inlet between the oxidant side and the cathode of the second cell;
an anode feed passageway having a fuel inlet and a plurality of fuel outlets between the fuel side and the anode of the first cell, the fuel outlets located between the cell peripheral edge and the anode central region; and
an anode recycle passageway having a recycle inlet fluidly coupled to spent fuel, including cell reaction product water, at the anode central region and a recycle outlet fluidly coupled to the anode feed passageway; and
means for causing spent fuel, including cell reaction product water from the anode central region, to flow into the recycle inlet, along the anode recycle passageway, out the recycle outlet and into a flow of fuel passing into the anode feed passageway towards the fuel outlet so the cell reaction product water can be used as a steam source for reforming.

25. A fuel cell assembly comprising:
a fuel cell stack of claim 24; and
a housing containing the fuel cell stack, the housing comprising a gas-permeable, porous wall surrounding the cell peripheral edges, said porous wall fluidly coupled to a source of an oxygen-containing gas.

26. A fuel cell stack comprising:
at least first and second cells and a separator assembly;
said cells each comprising:
    an anode comprising an anode central region;
    a cathode comprising a cathode central region;
    an electrolyte between the anode and the cathode; and
    a cell peripheral edge;
    said separator assembly comprising:
        a fluid separator having a fuel side and an oxidant side and a separator peripheral edge;
        a porous anode spacer element, having an anode central region and an anode spacer peripheral edge, between the fuel side and the anode of the first cell;
        a porous cathode spacer element, having a cathode central region and a cathode spacer peripheral edge, between the oxidant side and the cathode of the second cell;
        a cathode exhaust passageway having a cathode exhaust outlet and a cathode exhaust inlet at the cathode central region;
        an anode feed passageway comprising a fuel inlet and a generally continuous-loop anode feed tube spaced apart from the cell peripheral edge between the fuel side and the anode of the first cell, said feed tube having inwardly-directed and outwardly-directed fuel outlets so that spent fuel, including residual fuel, moves both inwardly towards the anode central region and outwardly towards the anode spacer peripheral edge to pass through the anode spacer peripheral edge;
        an anode recycle passageway having a recycle inlet fluidly coupled to spent fuel, including cell reaction product water, at the anode central region and a recycle outlet fluidly coupled to the anode feed passageway; and
        means for causing spent fuel, including cell reaction product water from the anode central region, to flow into the recycle inlet, along the anode recycle passageway, out the recycle outlet and into a flow of fuel passing into the anode feed passageway towards the fuel outlets so the cell reaction product water can be used as a steam source for reforming; and
an air deflector spaced-apart from and overlying the anode separator element to help prevent generally radially-inwardly moving air from contacting the anode while permitting the generally radially-inwardly moving air access to the cathode spacer peripheral edge.

27. A method for operating a fuel cell stack comprising:
accessing a fuel cell stack comprising alternating cells and separator assemblies, each said cell comprising an anode, a cathode and an electrolyte between the anode and the cathode, the anodes each having an anode peripheral edge and an anode central region, the cathodes each having a cathode peripheral edge and a cathode central region, each said separator assembly comprising a fluid separator with a separator peripheral edge;
flowing an oxygen-containing gas generally radially inwardly to said cathode peripheral edges;
deflecting said oxygen-containing gas away from the anode peripheral edges; and
feeding a fuel to the anodes to a position spaced-apart from the anode peripheral edge of each said anode.

28. The method according to claim 27 wherein the fuel feeding step is carried out by flowing the fuel generally radially inwardly and outwardly using a generally continuous-loop anode feed tube having inwardly-directed and outwardly-directed fuel outlets located spaced-apart from the anode peripheral edge and the anode central region.

29. The method according to claim 27 further comprising the step of recycling spent fuel, including cell reaction product water, from positions adjacent to the anodes.

30. The method according to claim 29 wherein:
the fuel feeding step takes place using anode feed passageways; and
the recycling step is carried out using at least one anode recycle passageway having a recycle inlet at the anode central region and a recycle outlet fluidly coupled to the anode feed passageway by flowing the spent fuel from the recycle inlet, through the anode recycle passageway, out the recycle outlet and into a flow of fuel passing into the anode feed passageway towards the fuel outlet.

31. The method according to claim 27 further comprising the step of:
flowing spent fuel, including residual fuel, generally radially outwardly past the anode peripheral edges; and
combusting said outwardly flowing residual fuel after it has passed through the anode peripheral edges.

32. The method according to claim 27 further comprising preheating said oxygen-containing gas by passing said oxygen-containing gas through a porous enclosure enclosing said fuel cell stack.

33. The method according to claim 32 wherein said preheating step is carried out using a porous enclosure comprising a circumferential metal sponge material.

34. A method for operating a fuel cell stack comprising:
accessing a fuel cell stack comprising alternating cells and separator assemblies, each said cell comprising an anode, a cathode and an electrolyte between the anode and the cathode, the anodes each having an anode peripheral edge and an anode central region, the cathodes each having a cathode peripheral edge and a cathode central region, each said separator assembly comprising a fluid separator with a separator peripheral edge;
flowing an oxygen-containing gas generally radially inwardly to said cathode peripheral edges; and
feeding a fuel between the anode peripheral edge and the anode central region of each said anode by flowing the fuel generally radially inwardly and outwardly using a generally continuous-loop anode feed tube having inwardly-directed and outwardly-directed fuel outlets located spaced-apart from the anode peripheral edge and the anode central region.

35. A method for operating a fuel cell stack comprising:
accessing a fuel cell stack comprising alternating cells and separator assemblies, each said cell comprising an anode, a cathode and an electrolyte between the anode and the cathode, the anodes each having an anode peripheral edge and an anode central region, the cathodes each having a cathode peripheral edge and a cathode central region, each said separator assembly comprising a fluid separator with a separator peripheral edge;
flowing an oxygen-containing gas generally radially inwardly to said cathode peripheral edges;

feeding a fuel to the anodes to a position between the anode peripheral edge and the anode central region of each said anode using anode feed passageways so that spent fuel, including residual fuel and cell reaction product water, flows radially inwardly and outwardly; and recycling spent fuel, including cell reaction product water, from the anode central regions using anode recycle passageways, each said anode recycle passageway having a recycle inlet at the anode central region and a recycle outlet, by flowing the spent fuel from the recycle inlets, through the anode recycle passageway and into a flow of fuel passing along the anode feed passageway towards the fuel outlet.

36. A fuel cell system comprising:

a fuel cell module comprising:

a module interior;

a plurality of the fuel cell assemblies housed within the module interior, each said fuel cell assembly comprising first and second cells and a separator therebetween, said cells each comprising an anode, a cathode and an electrolyte therebetween, the separator comprising: a fluid separator having a fuel side and an oxidant side and a separator peripheral edge, an anode spacer element, having an anode spacer peripheral edge, between the fuel side and the anode of the first cell, a cathode spacer element, having a cathode spacer peripheral edge, between the oxidant side and the cathode of the second cell, a cathode exhaust passageway having an exhaust inlet between the oxidant side and the cathode of the second cell, and an anode feed passageway having a fuel outlet between the fuel side and the anode of the first cell spaced-apart from the anode spacer peripheral edge so that spent fuel, including residual fuel, can move outwardly and pass through the anode spacer peripheral edge;

a cathode exhaust line coupling the cathode exhaust passageway to a flue gas exit exterior of the module enclosure; and a fuel line fluidly coupled to the anode feed passageway;

a source of oxygen-containing gas fluidly coupled to the module interior so to supply said housing interior with oxygen-containing gas; and a source of fuel gas fluidly coupled to the anode feed passageways of the fuel cell assemblies.

37. The system according to claim 36 wherein each fuel cell assembly comprises:

an anode recycle passageway having a recycle inlet fluidly coupled to spent fuel, including cell reaction product water, at the anode central region and a recycle fluidly coupled to the anode feed passageway.

an anode feed manifold from which the anode feed passageways extend; and an anode recycle manifold from which the anode recycle passageways extend; and further comprising:

a spent fuel ejector comprising an ejector inlet fluidly connected to the fuel line, an ejector outlet fluidly coupled to the anode feed manifold, an inlet fluidly coupled to the anode recycle manifold, and means for causing spent fuel, including cell reaction product water from the anode central region, to flow into the recycle inlet, along the anode recycle passageway, out the recycle outlet and into a flow of fuel passing into the anode feed passageway towards the fuel outlet so that the cell reaction product water can be used as a steam source for reforming.

38. The system according to claim 37 wherein the fuel line comprises a first fuel line fluidly connected to the ejector inlet, a second fuel line fluidly connected between the ejector outlet and the anode feed manifold and valving controlling the flow along the first and second fuel lines.

39. The system according to claim 37 further comprising a fuel gas compressor fluidly coupling the fuel gas source to the fuel lines to ensure proper pressure at the ejection inlet.

40. The system according to claim 36 further comprising an elevated temperature desulfurizer fluidly coupled between the source of fuel gas and the fuel lines, the desulfurizer comprising a heating element fluidly coupled to the flue gas exit so that flue gas can be used to heat the desulfurizer.

41. The system according to claim 40 an ambient temperature desulfurizer fluidly coupled to a partial oxidizer, the combination being in parallel with the elevated temperature desulfurizer and usable during start up procedures instead of the high temperature desulfurizer.

42. The system according to claim 36 further comprising a gas deflector spaced-apart from and overlying the anode spacer peripheral edge to help prevent generally radially inwardly-moving oxygen-containing gas from contacting the anode while permitting the generally radially-inwardly moving oxygen-containing gas access to the cathode spacer peripheral edge.

* * * * *